A. HERRMANN.
SELF HEATING SOLDERING TOOL.
APPLICATION FILED NOV. 30, 1908.
965,518.
Patented July 26, 1910.
2 SHEETS—SHEET 1.
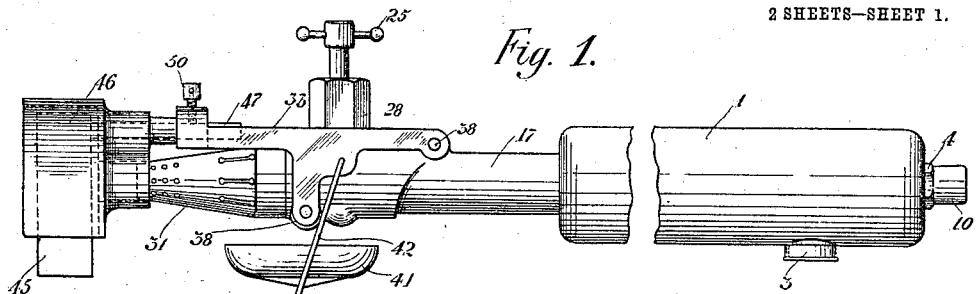
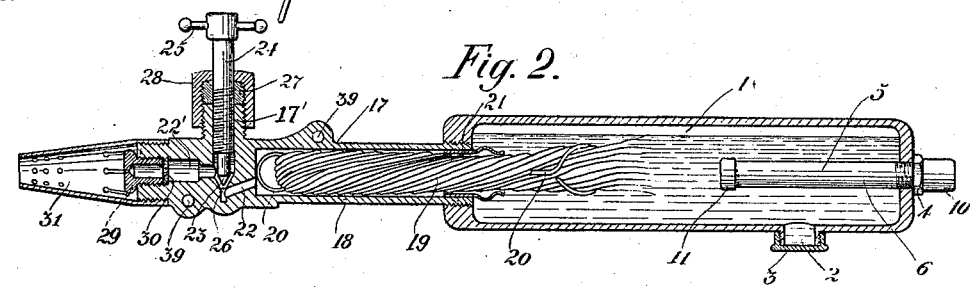
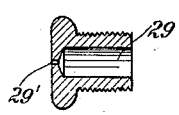
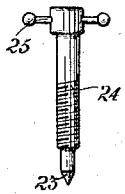
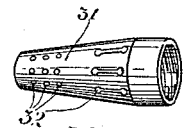
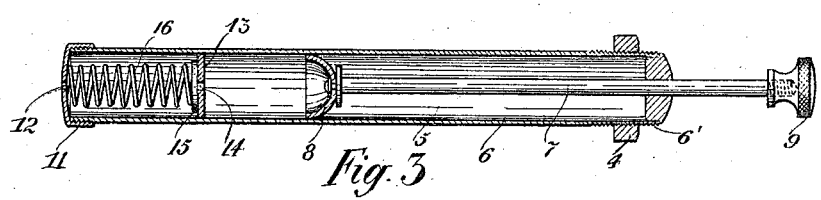
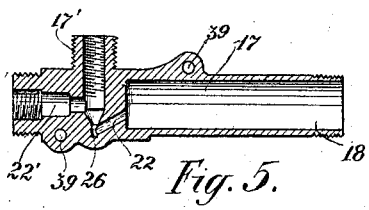
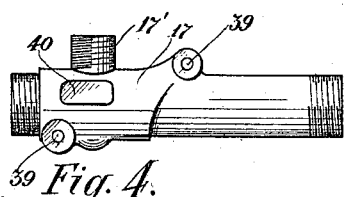
Witnesses:
Inventor:
Albert Herrmann
By Joshua R. H. Potts
Attorney.

A. HERRMANN.
SELF HEATING SOLDERING TOOL.
APPLICATION FILED NOV. 30, 1908.

965,518.

Patented July 26, 1910.
2 SHEETS—SHEET 2.

Witnesses:
R. C. Bretch
A. A. Olson

Inventor:
Albert Herrmann.
By Joshua R. H. Potts
Attorney.

UNITED STATES PATENT OFFICE.

ALBERT HERRMANN, OF CHICAGO, ILLINOIS.

SELF-HEATING SOLDERING-TOOL.

965,518.  Specification of Letters Patent.  Patented July 26, 1910.

Application filed November 30, 1908. Serial No. 465,128.

*To all whom it may concern:*

Be it known that I, ALBERT HERRMANN, a citizen of the United States, residing at Chicago, county of Cook, and State of Illinois, have invented certain new and useful Improvements in Self-Heating Soldering-Tools, of which the following is a specification.

My invention relates to that type of tools in which is employed a hydro-carbon as a fuel, and more particularly to that class of the same known as self heating soldering irons, in which the soldering points are maintained at a constant temperature by means of heat applied to them continuously while in use.

The object of my invention is to provide a tool of the character mentioned which will be of such improved construction as to make it possible to readily detach the soldering point and its holder if desired, in which event the tool may be used as a blow torch.

A further object of my invention is to provide a tool of the character mentioned which may be readily and easily manipulated and of durable construction.

A still further object of my invention is to provide a tool of the class mentioned which will be of the highest possible efficiency, and which will be comparatively simple of construction hence of low cost to manufacture.

Other objects will appear hereinafter.

With these objects in view my invention consists generally in a handle-forming fuel reservoir communicating with the forward extremity of which is a gas generator, and to the forward extremity of said generator is secured a hydro-carbon vapor burner.

My invention further consists in a soldering point supporting frame adapted to be detachably secured to said generator in such a manner as to cause the flame issuing from the burner to impinge directly upon the soldering point secured in said supporting frame.

My invention further consists in certain details of construction and arrangement of parts all as will be hereinafter more fully described and particularly pointed out in the claims.

My invention will be more readily understood by reference to the accompanying drawings forming a part of this specification, and in which—

Figure 10:
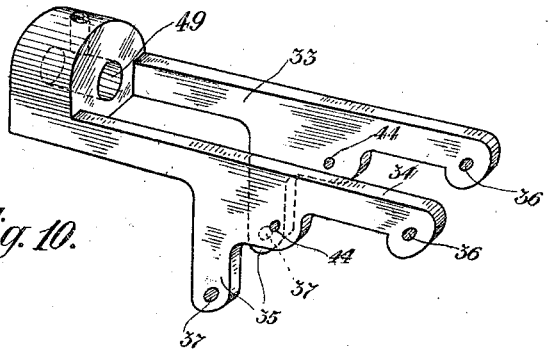
Figure 11:
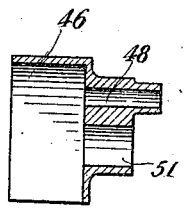
Figure 12:
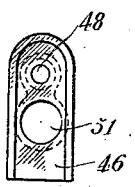
Figure 14:
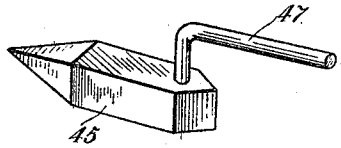
Figure 13:
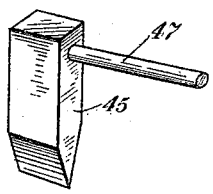
Figure 15:
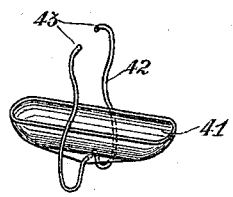

Figure 1 is a side elevation of the preferable form of my device complete. Fig. 2 is a vertical longitudinal section through the same, the soldering point and the supporting frame therefor being detached. Fig. 3 is an enlarged sectional detail of the air pump provided in the fuel reservoir. Fig. 4 is a detail side elevation of the generator. Fig. 5 is a vertical longitudinal section thereof. Figs. 6, 7, and 8 are details of parts of said generator. Fig. 9 is a perspective view of the tubular burner. Fig. 10 is an enlarged perspective view of the soldering point supporting frame detached. Fig. 11 is a vertical longitudinal section of the soldering point housing embodied in my invention. Fig. 12 is an end elevation thereof. Figs. 13 and 14 are perspective views of different forms of soldering points which may be employed, and Fig. 15 is a perspective view of the priming pan detached.

Referring now to the drawings 1 indicates the preferably cylindrical handle of my tool the same being hollow, forming a fuel reservoir. An opening 2 provided with a plug 3 facilitates filling said reservoir with the gasolene or other liquid fuel used. Centrally positioned and secured, preferably threaded in the rearward extremity of said reservoir, the same being locked in position by a lock nut 4 is an air pump 5. Said pump consists of the casing 6 in which is reciprocally mounted the piston rod 7, to the inner extremity of which is suitably secured a preferably semi-cylindrical piston head 8. A hand piece 9 provided at the outer extremity of said rod 7 serves an obvious purpose. When not in use said hand piece 9, and hence the piston rod 7 may be locked in position by a cap 10 adapted to be threaded upon the exteriorly projecting end portion 6′ of said casing 6, covering said hand piece. The inner extremity of said casing 6 is covered by a cap 11 provided with a perforation 12.

13 is a partition or head provided with an opening 14. A disk valve 15 held in position by a coiled spring 16 being adapted to normally close said opening 14, obviously preventing any of the liquid fuel contained in the reservoir 1 from entering the pump.

Secured, preferably threaded, in the forward end portion of the member 1 is a gas generator 17. Resting in the rearward cylindrical chamber 18 of said generator, the same extending into the reservoir 1 is a suitable wick 19. Said wick is preferably wound upon a wire member 20 so as to facilitate readily inserting or removing said wick. A tubular spring member 21 tightly fitting the inner end portion of the member 17 and rearwardly projecting therefrom the same encircling and slightly clamping the wick 19 serves as a means of holding said wick in position in said chamber 18. Leading from said chamber 18 is a vapor passage 22.

23 indicates a needle valve the stem 24 thereof being threaded into a projection 17' of the member 17. By rotating said stem 24, by means of the hand piece 25, it is obvious that said valve may be seated or unseated, the same being adapted when in seated position to close the opening 26 leading from said passage 22. A packing 27, preferably of asbestos, held in position by a cap 28 threaded upon said projection 17' of the member 17 facilitates an air-tight connection between said valve stem and the member 17. Leading from said opening 26 is a passage 22', in the enlarged forward portion of which is threaded a tubular plug 29, the forward port forming opening 29' of which is very small. Provided at and extending across the rearward end of the plug 29 is a screen 30, the purpose of the same being to strain all liquid fuel passed through the same thereby preventing clogging of said port 29' in the plug 29. Detachably secured, preferably threaded, upon the forward end portion of the member 17 is a Bunsen burner tube 31 preferably frusto conical in shape, the same being provided with the draft openings 32.

33 indicates a substantially U-shaped soldering point supporting frame, the rearward end portions of the arms 34, and the lower end portions of the depending arms 35 of which are provided with perforations 36 and 37 respectively. Said arms 34 and 35 are at such a distance apart as to be adapted to fit snugly upon the generator 17, in which position said members are locked thereto by means of removable pins 38 resting in the perforations 36 and 37 and extending through perforations 39 provided in said member 17. When in position upon the generator 17 said arms 35 also rest upon bosses 40 formed upon either side of said member 17, thereby facilitating a more rigid connection between said parts. 41 indicates a priming pan the same being suspended from the member 33 by means of a wire member 42, the inwardly extending end portions 43 of which engage perforations 44 provided in said member 33.

45 indicates soldering points, slightly different forms of which are shown in Figs. 13 and 14, 46 indicating a housing therefor. The shanks 47 of said soldering points 45 when the same are in position in said housing rest snugly in the circular slot 48 provided in said housing 46, the end portions thereof being adapted to rest in the circular slot 49 provided for the reception of the same in the member 33, they being securely held therein by means of a set screw 50. Said member 46 is provided preferably directly beneath the circular slot 48 with a circular opening 51 into which, when said member is in position, projects the outer end portion of the burner 31, the shanks 47 of the soldering points 45 being so formed as to position said points directly in front of said opening and hence directly in front of said burner, resulting in an obvious advantage.

In practice the reservoir is filled with gasolene through the opening 2 therein. By means of the air pump 5 the liquid fuel in the reservoir is placed under pressure. Fuel is placed in the priming pan 41 and ignited. The ignition of said fuel causes the heating of the generator, consequently causing the passage, upon opening the valve 23, of combustible vapor from the opening or port 29', which igniting from the flame issuing from the pan obviously causes the rapid heating of the soldering point, the flame issuing from the burner impinging directly upon the same. Before the air pressure developed within the reservoir has been dissipated the handle has become sufficiently heated to cause the highly volatile gasolene contained therein to itself maintain a pressure sufficient to expel the vapor at a suitable velocity. With such conditions the priming pan may be detached, it being of no further use until it is again desired to light the torch. Because of the provision of the wick 19 it is immaterial in which position the tool is held, a constant flow of fuel, enough to maintain a flame, being because of such provision positively insured. As before stated the soldering points may if desired, be removed in which event the tool may be efficiently used as a blow torch.

While I have shown what I deem to be the preferable form of my device I do not wish to be limited thereto as there might be many changes made in the details of construction and arrangement of parts without departing from the spirit of my invention.

Having described my invention what I claim as new and desire to secure by Letters Patent is:

1. The combination in a gasolene soldering iron, of a combined gasolene reservoir and handle portion, a pump carried by said reservoir and handle portion for charging the same with air under pressure, a tube fixed to and communicating with the reservoir and handle portion and having a minute discharge aperture in its end remote therefrom and also having apertured lugs at its opposite sides and at different points in its length, a valve for controlling the passage of gasolene through the said tube, a burner tube connected to and extending from the first named tube and tapered toward its upper end, an iron-holder having portions disposed at opposite sides of and connected to the apertured lugs on the first named tube and also having a vertical bore, a set screw bearing in the iron-holder and arranged to extend to the said bore, an iron having a shank disposed in the bore of the holder and engaged by said set screw, and a shield for the iron having a depending tube snugly receiving the burner tube and also having a depending sleeve receiving the shank of the iron.

2. The combination in a gasolene soldering iron, of a combined gasolene reservoir and handle portion, a pump carried by said reservoir and handle portion for charging the same with air under pressure, a tube fixed to and communicating with the reservoir and handle portion and having a minute discharge aperture in its end remote therefrom, a valve for controlling the passage of gasolene through said tube, a burner tube fixed with respect to and extending from the first named tube and tapered toward its upper end, an iron-holder fixed on the first named tube and having a vertical bore, a set screw bearing in the iron-holder and arranged to extend to said bore, an iron disposed above the burner tube and having a shank arranged in the bore of the holder and engaged by said set screw, and a shield for the iron, having a depending sleeve snugly receiving the burner tube and also having a depending sleeve receiving the shank of the iron.

3. The combination in a gasolene soldering iron, of a burner tube tapered to its upper end, a valved tube for supplying the burner tube with gasolene, an iron-holder fixed on the valved tube, an iron having a shank detachably connected to the iron-holder, and a shield connected to the shank of the iron and having a depending sleeve snugly receiving the upper portion of the burner tube.

4. In a device of the class described, the combination of a handle forming reservoir; a gas generator communicating with said reservoir; a burner provided at the forward extremity of said generator; means for regulating the flow of fuel through said generator; a soldering point provided with a supporting shank; a soldering point housing adapted to receive said point and provided with an opening adapted to permit the passage of the shank of said point and an opening adapted to receive the end of said burner; and means on said generator for engaging said point shank to secure said housing and point in position, substantially as described.

5. In a device of the class described, the combination of a handle forming reservoir; a gas generator communicating with said reservoir; a burner provided at the forward extremity of said generator; means for regulating the flow of fuel through said generator; a soldering point provided with a supporting shank; a soldering point housing adapted to receive said point and provided with an opening adapted to permit the passage of the shank of said point and an opening adapted to receive the end of said burner; a support removably secured to said generator and provided with an opening adapted to receive said point shank; and a set screw for securing said shank in said opening, substantially as described.

6. In a device of the class described, the combination of a handle-forming reservoir; a gas generator communicating with said reservoir; a burner provided at the forward extremity of said generator; means for regulating the flow of fuel through said generator; a soldering point provided with a supporting shank; a support secured to said generator and provided with a socket and set screw adapted to receive and secure said supporting shank; and a housing adapted to receive and encompass said soldering point on four sides, the said housing being provided with an opening adapted to permit the passage of said point shank and an opening adapted to receive the end of said burner, substantially as described.

In testimony whereof I have signed my name to this specification in the presence of two subscribing witnesses.

ALBERT HERRMANN.

Witnesses:
 HELEN F. LILLIS,
 JANET E. HOGAN.